US011346498B1

(12) United States Patent
Nair et al.

(10) Patent No.: US 11,346,498 B1
(45) Date of Patent: May 31, 2022

(54) LIGHT CURTAIN ALIGNMENT USING BEAM INTENSITIES

(71) Applicant: Rockwell Automation Technologies, Inc., Mayfield Heights, OH (US)

(72) Inventors: Suresh R. Nair, Amherst, NH (US); Burt Sacherski, Nashua, NH (US); Yongyao Cai, Acton, MA (US); Lee A. Lane, Medford, MA (US); Brian J. Taylor, Boston, MA (US); Ashley M. Killian, Eastlake, OH (US); Kevin Zomchek, Nashua, NH (US); Michelle Poublon, Nashua, NH (US); Linxi Gao, Reading, MA (US); Timothy P. Wolfe, Medford, MA (US); Rebecca R. Jaeger, Somerville, MA (US); Wayne R. Foster, Tyngsborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 10 days.

(21) Appl. No.: 17/159,918

(22) Filed: Jan. 27, 2021

(51) Int. Cl.
*F16P 3/14* (2006.01)
*H05B 47/10* (2020.01)
*G01V 8/20* (2006.01)

(52) U.S. Cl.
CPC ............... *F16P 3/144* (2013.01); *G01V 8/20* (2013.01); *H05B 47/10* (2020.01); *G05B 2219/1103* (2013.01)

(58) Field of Classification Search
CPC F16P 3/144; H05B 47/10; G01V 8/20; G05B 2219/1103
See application file for complete search history.

(56) References Cited

U.S. PATENT DOCUMENTS 9,910,186 B2  3/2018  Stein et al.

OTHER PUBLICATIONS

Manfred Stein, Most advanced Safety Light Curtain in the Market, Guardshield 450L, Jan. 2018, pp. 1-21, Rockwell Automation, Inc.
Derek Charge, 450L Product Update, Jan. 14, 2020, pp. 1-39, Rockwell Automation, Inc.

*Primary Examiner* — Georgia Y Epps
*Assistant Examiner* — Don J Williams
(74) *Attorney, Agent, or Firm* — Kunzler Bean & Adamson; Bruce R. Needham

(57) ABSTRACT

A component for light curtain alignment includes a light intensity receiver that receives a plurality of light intensity signals from beam receivers of a receiver unit of a light curtain. The light curtain includes a transmitter unit with beam transmitters arranged linearly on the transmitter unit. The light curtain includes the receiver unit with the plurality of beam receivers arranged linearly. Each beam receiver is configured to receive light from a corresponding beam transmitter. The component includes a light intensity transmitter configured to transmit, from the light curtain, the plurality of light intensity signals received by the light intensity receiver, where each light intensity signal is from one or more beam receivers, and a trip transmitter that transmits a trip signal in response to determining that a light intensity signal from a beam receiver of the plurality of beam receivers is below a trip threshold.

20 Claims, 7 Drawing Sheets

LIGHT CURTAIN ALIGNMENT USING BEAM INTENSITIES

BACKGROUND INFORMATION

The subject matter disclosed herein relates to light curtains and more specifically to aligning a transmitter unit and a receiver unit of a light curtain using light intensity signals of beam receivers of the light curtain.

BRIEF DESCRIPTION

A component for light curtain alignment is disclosed. A method also performs the functions of the component. The component includes a light intensity receiver configured to receive a plurality of light intensity signals from a plurality of beam receivers of a receiver unit of a light curtain. The light curtain includes a transmitter unit with a plurality of beam transmitters arranged linearly on the transmitter unit. Each beam transmitter is configured to transmit a narrow beam of light. The light curtain includes the receiver unit with the plurality of beam receivers arranged linearly. Each beam receiver is configured to receive light from a corresponding beam transmitter of the plurality of beam transmitters. The component includes a light intensity transmitter configured to transmit, from the light curtain, the plurality of light intensity signals received by the light intensity receiver. Each light intensity signal is from one or more beam receivers of the plurality of beam receivers. The component includes, in some embodiments, a trip transmitter configured to transmit a trip signal in response to determining that a light intensity signal from a beam receiver of the plurality of beam receivers is below a trip threshold.

Another component for alignment of a light curtain includes a light intensity receiver configured to receive a plurality of light intensity signals from a plurality of beam receivers of a receiver unit of a light curtain. The light curtain includes a transmitter unit with a plurality of beam transmitters arranged linearly on the transmitter unit where each beam transmitter is configured to transmit a narrow beam of light. The light curtain includes the receiver unit with the plurality of beam receivers arranged linearly. Each beam receiver is configured to receive light from a corresponding beam transmitter of the plurality of beam transmitters. The light curtain includes one or more vibration sensors. The component includes a light intensity transmitter configured to transmit from the light curtain a plurality of light intensity signals. Each light intensity signal is from one or more beam receivers. In some embodiments, the component includes a trip transmitter that transmits a trip signal in response to determining that a light intensity signal from a beam receiver of the plurality of beam receivers is below a trip threshold.

A method for alignment of a light curtain includes receiving a plurality of light intensity signals. Each light intensity signal is from one or more beam receivers of a plurality of beam receivers of a light curtain. The light curtain includes a transmitter unit with a plurality of beam transmitters arranged linearly on the transmitter unit. Each beam transmitter is configured to transmit a narrow beam of light. The light curtain includes a receiver unit with the plurality of beam receivers arranged linearly. Each beam receiver is configured to receive light from a corresponding beam transmitter of the plurality of beam transmitters. The method includes transmitting from the light curtain the plurality of light intensity signals, and transmitting a trip signal in response to determining that a light intensity signal from a beam receiver of the plurality of beam receivers is below a trip threshold.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
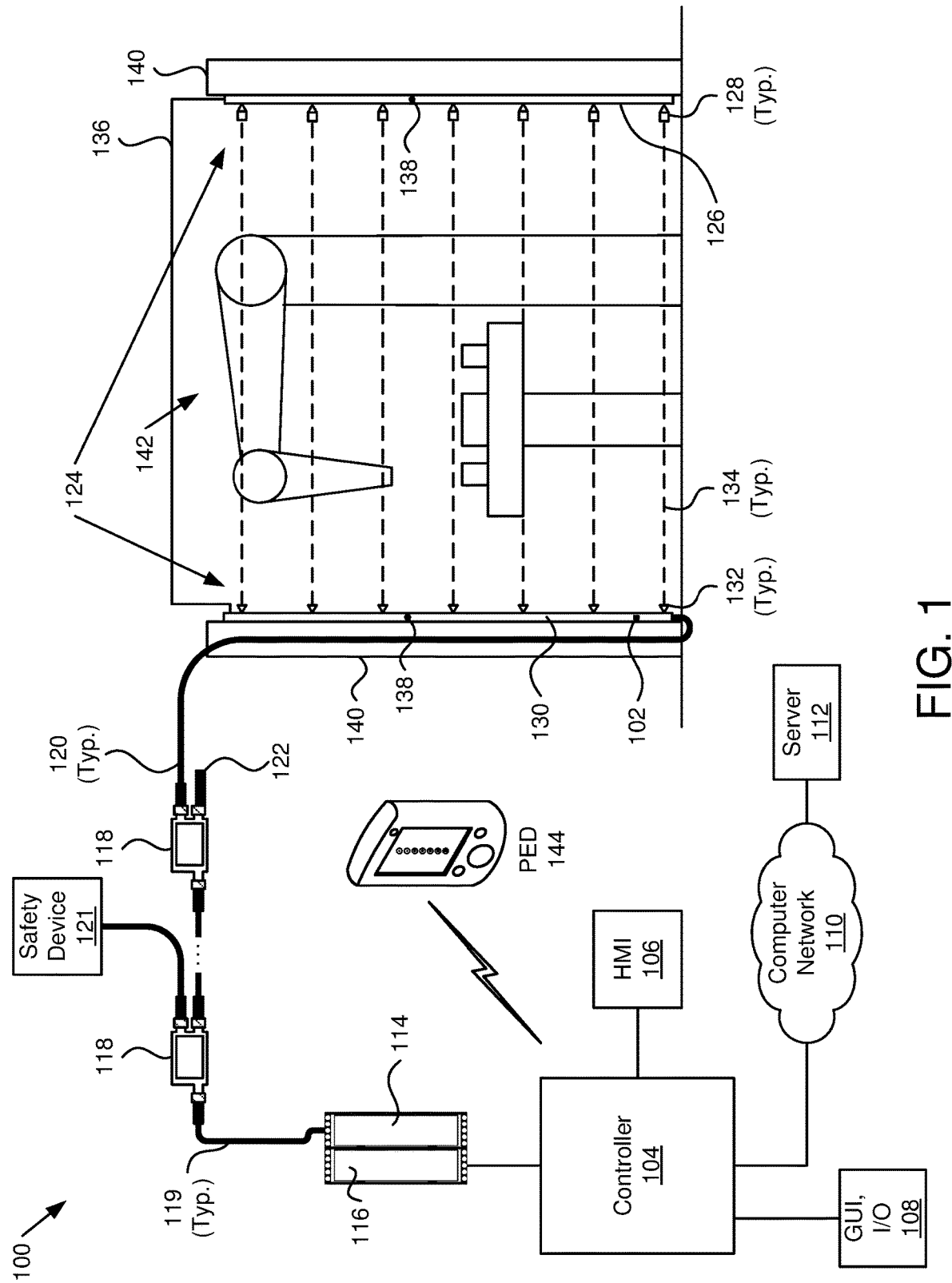
FIG. 1 is a schematic block diagram of a system for light curtain beam alignment according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, circuits, transmitters, etc. in order to more particularly emphasize their implementation independence. For example, a module may be implemented as a hardware circuit comprising custom VLSI circuits or gate arrays, off-the-shelf semiconductors such as logic chips, transistors, or other discrete components. For example, some embodiments might be implemented with hardware circuits to transport light intensity signals from one or more beam receivers of a light curtain. A module, circuit, transmitter and the like may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor. As used herein, a computer readable storage medium or computer readable storage media are non-transitory.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a safety relay, a controller, a client, server, a network environment and the like by providing for the computer program product to coexist with applications, operating systems and network operating systems software and then installing the computer program product on the safety relay, controller, clients, servers, etc. in the environment where the computer program product will function. In one embodiment software is identified on the safety relay, controller, clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

The description of elements in each figure may refer to elements of proceeding figures. Like numbers refer to like elements in all figures, including alternate embodiments of like elements.

A component for light curtain alignment is disclosed. A method also performs the functions of the component. The component includes a light intensity receiver configured to receive a plurality of light intensity signals from a plurality of beam receivers of a receiver unit of a light curtain. The light curtain includes a transmitter unit with a plurality of beam transmitters arranged linearly on the transmitter unit. Each beam transmitter is configured to transmit a narrow beam of light. The light curtain includes the receiver unit with the plurality of beam receivers arranged linearly. Each beam receiver is configured to receive light from a corresponding beam transmitter of the plurality of beam transmitters. The component includes a light intensity transmitter configured to transmit, from the light curtain, the plurality of light intensity signals received by the light intensity receiver. Each light intensity signal is from one or more beam receivers of the plurality of beam receivers. The component includes, in some embodiments, a trip transmitter configured to transmit a trip signal in response to determining that a light intensity signal from a beam receiver of the plurality of beam receivers is below a trip threshold.

In one embodiment, the component includes a light intensity receiver module configured to receive the plurality of light intensity signals and a light intensity display module configured to display a light intensity indicator for each light intensity signal and a relative position of the one or more beam receivers associated with each light intensity signal. The light intensity indicators for each light intensity signal and corresponding positions of the one or more beam receivers provide an indication of beam alignment. In a further embodiment, the light intensity receiver module and the light intensity display module are on a portable electronic device. In other embodiments, the plurality of light intensity signals are transmitted to the portable electronic device wirelessly.

In some embodiments, the component includes a safe module configured to prevent the trip transmitter from transmitting the trip signal during a safe mode. In other embodiments, the safe module is configured to activate the light intensity transmitter to transmit the plurality of light intensity signals during the safe mode. In other embodiments, the light intensity transmitter and the trip transmitter operate simultaneously during an operation mode. In other embodiments, the light intensity transmitter transmits the plurality of light intensity signals while the trip transmitter monitors the plurality of light intensity signals to determine if a light intensity signal from a beam receiver of the plurality of beam receivers drops below the trip threshold which triggers the trip transmitter to transmit the trip signal.

In some embodiments, the component includes a threshold module configured to notify a user adjusting positioning of the transmitter unit and/or the receiver unit of a target threshold for each of the plurality of beam receivers. The target threshold includes the trip threshold adjusted by an amount of light intensity degradation due to an expected amount of vibration at the transmitter unit and/or the receiver unit. In a further embodiment, the component includes an attenuation calculator configured to determine the amount of light intensity degradation for each of the plurality of beam receivers due to vibration of the light curtain. In other embodiments, the attenuation calculator is configured to determine the amount of light intensity degradation based on light intensity signals from the light intensity receiver and operational data of equipment near the light curtain causing vibrations to the light curtain.

In other embodiments, the component includes a vibration sensor in the transmitter unit and/or a vibration sensor in the receiver unit of the light curtain. The attenuation calculator is configured to use sensed vibration in the transmitter unit and/or in the receiver unit to determine the amount of light intensity degradation for each of the plurality of beam receivers due to vibration of the light curtain. In other embodiments, the component includes a vibration learning module configured to use vibration data and light intensity signal data for transmitter units and receiver units of a plurality of light curtains to determine a relationship between vibration and light intensity degradation. The attenuation calculator is configured to use the relationship determined by the vibration learning module to determine the amount of light intensity degradation based on the vibration of the light curtain.

Another component for alignment of a light curtain includes a light intensity receiver configured to receive a plurality of light intensity signals from a plurality of beam receivers of a receiver unit of a light curtain. The light curtain includes a transmitter unit with a plurality of beam transmitters arranged linearly on the transmitter unit where each beam transmitter is configured to transmit a narrow beam of light. The light curtain includes the receiver unit with the plurality of beam receivers arranged linearly. Each beam receiver is configured to receive light from a corresponding beam transmitter of the plurality of beam transmitters. The light curtain includes one or more vibration sensors. The component includes a light intensity transmitter configured to transmit from the light curtain a plurality of light intensity signals. Each light intensity signal is from one or more beam receivers. In some embodiments, the component includes a trip transmitter that transmits a trip signal in response to determining that a light intensity signal from a beam receiver of the plurality of beam receivers is below a trip threshold.

In some embodiments, the one or more vibration sensors include a vibration sensor in the transmitter unit and/or a vibration sensor in the receiver unit. In other embodiments, the component includes an attenuation calculator configured to determine an amount of light intensity degradation for each of the plurality of beam receivers due to vibration of the light curtain sensed by the one or more vibration sensors. In other embodiments, the component includes a threshold module that notifies a user adjusting positioning of the transmitter unit and/or the receiver unit of a target threshold for each of the plurality of beam receivers. The target threshold includes the trip threshold adjusted by an amount of light intensity degradation determined by the attenuation calculator.

A method for alignment of a light curtain includes receiving a plurality of light intensity signals. Each light intensity signal is from one or more beam receivers of a plurality of beam receivers of a light curtain. The light curtain includes a transmitter unit with a plurality of beam transmitters arranged linearly on the transmitter unit. Each beam transmitter is configured to transmit a narrow beam of light. The light curtain includes a receiver unit with the plurality of beam receivers arranged linearly. Each beam receiver is configured to receive light from a corresponding beam transmitter of the plurality of beam transmitters. The method includes transmitting from the light curtain the plurality of light intensity signals, and transmitting a trip signal in response to determining that a light intensity signal from a beam receiver of the plurality of beam receivers is below a trip threshold.

In some embodiments, the method includes receiving, at a portable electronic device, the plurality of light intensity signals, and displaying a light intensity indicator for each light intensity signal and a relative position of the one or more beam receivers associated with each light intensity signal. The light intensity indicators for each light intensity signal and corresponding positions of the one or more beam receivers provide an indication of beam alignment. In another embodiment, the method includes determining the amount of light intensity degradation for each of the plurality of beam receivers due to vibration of the light curtain, and notifying a user adjusting positioning of the transmitter unit and/or the receiver unit of a target threshold for each of the plurality of beam receivers. The target threshold includes the trip threshold adjusted by the amount of light intensity degradation due to an expected amount of vibration at the transmitter unit and/or the receiver unit.

FIG. 1 is a schematic block diagram of a system 100 for light curtain beam alignment according to an embodiment. The system 100 includes an intensity apparatus 102, a controller 104, a human interface 106, a graphical user interface and input/output devices 108, a computer network 110, a server 112, a safety relay 114, a network interface 116, connection taps 118, trunk line conductors 119, tap conductors 120, safety devices 121, a terminator 122, a light curtain 124, a transmitter unit 126, beam transmitters 128, a receiver unit 130, beam receivers, 132, light beams 134, transmitter/receiver connecting cable 136, vibration sensors 138, posts 140, industrial equipment 142, and a portable electronic device 144, which are described below.

Aligning the transmitter unit and the receiver unit of a conventional light curtain may be difficult where typically the light curtain includes only a binary output where a trip signal is displayed if each beam receiver does not receive a light intensity from a corresponding beam transmitter above a threshold. Having a display of light intensity for each beam receiver 132 or for a group of beam receivers 132 of the light curtain 124 facilitates easier alignment.

The intensity apparatus 102 provides a way to align beam transmitters 128 of the transmitter unit 126 and beam receivers 132 of the receiver unit 130 using light intensity information of the beam receivers 132. While the intensity apparatus 102 is depicted in the receiver unit 130, the intensity apparatus 102, in some embodiments, may include portions in other locations, such as the transmitter unit 126, the safety relay 114, the controller 104, etc. In some embodiments, the receiver unit 130 is customized to include the intensity apparatus 102 configured to transmit light intensity signals from the beam receivers 132 where the light intensity signals from each beam receiver 132 or from a group of beam receivers 132 are displayed to aid in alignment of the transmitter unit 126 and/or the receiver unit 130 so that the light curtain 124 functions properly. In some embodiments, the intensity apparatus 102 transmits the light intensity signals and/or light intensity information to a portable electronic device ("PED") 144 for display where the PED 144 may be used at the light curtain 124 for beam alignment. In some embodiments, the intensity apparatus 102 uses expected vibration of the light curtain 124 to further align the transmitter unit 126 and the receiver unit 130. The intensity apparatus 102 is described in more detail below.

The controller 104, the human interface 106, the safety relay 114, the network interface 116, the connection taps 118, the trunk line conductors 119, the tap conductors 120, the safety devices 121, the terminator 122 and the light curtain 124, in some embodiments, are part of a machine safety system, which may also be called a condition monitoring system. The machine safety system includes safety devices that are installed based on a risk assessment of conditions of an industrial operation or other system with physical devices, such as the industrial equipment 142, to prevent injury and to minimize down time of the industrial operation. The machine safety system may be used to prevent injury from various types of equipment, such as manufacturing equipment, electrical equipment, motors, gears, sprayers, chemical process equipment, and the like.

The machine safety system, in some embodiments, is a GuardLink® system by Rockwell Automation® or similar machine safety system by another vendor. In some embodiments, a GuardLink system has an ability to daisy chain between connection taps 126 without having to loop the trunk line conductor 119 in a loop while meeting applicable safety standards, such being EN/ISO 13849-1 performance level "e" ("PLe") certified by TÜVRheinland® or other applicable certification.

The system 100, in some embodiments, includes a human-machine interface ("HMI") 106, such a control panel, at or near industrial equipment 142 of the industrial operation to allow a user to control and interact with the controller 104 to control the machine safety system. The HMI 106 may include a display screen and a means to receive user input.

The industrial equipment 142 is merely representative of a system that may be monitored by a machine safety system that includes the intensity apparatus 102. The industrial equipment 142 depicted in FIG. 1 includes assembly/processing equipment that interact with parts being manufactured. In other embodiments, the industrial operation may include a boiler, a gas turbine, electrical equipment, chemical processing equipment or any other system that can benefit from a machine safety system such as the machine safety system depicted in the system 100 of FIG. 1.

The industrial equipment 142, as with most industrial operations or other system with physical devices, has inherent dangers as well as equipment that may fail. The machine safety system includes components that enable monitoring of hazardous conditions, equipment health, environmental conditions, etc. to increase safety for personnel and to predict and/or detect equipment failure. In some embodiments, the components of the machine safety system help to improve performance of the industrial equipment 142 or other industrial operation. In some embodiments, the machine safety system includes safety devices, sensors and other components that are external to equipment within the industrial equipment 142. In other embodiments, the machine safety system receives input from equipment within the industrial equipment 142/industrial operation.

In some embodiments, the machine safety system includes a network interface 116 connected to a safety relay 114. The network interface 116 provides a network connection to the controller 104. For example, the machine safety system may include one internet protocol ("IP") address and may be able to provide information from safety devices through the single IP address to the controller 104. Such an arrangement beneficially reduces the number of IP addresses for a plant that includes the industrial equipment 142. Other networking interfaces 116 may include more than one IP address, for example, for multiple safety relays 114 or multiple lines from a safety relay 114. A safety device may include a non-contact switch, the light curtain 124, a locking switch, an emergency stop, an actuator, a cable pull switch, a key interlock switch, and the like. In other embodiments, one or more safety devices include an IP address. In other embodiments, the safety devices run on a proprietary network different than an IP network.

In the embodiment depicted in FIG. 1, the machine safety system includes trunk line conductors 119 running between connection taps 118. At each connection tap 118, a tap conductor 120 runs to a safety device, such as a non-contact switch, a light curtain 124, a locking switch, an emergency stop, a cable pull switch, etc.

The light curtain 124 is configured to send a trip signal when beams of light 134 between a transmitter unit 126 and receiver unit 130 are interrupted. The trip signal may be used to shut down equipment or take other action to prevent injury, and may also be used to prevent damage to equipment. Light curtains 124 are often used in industrial operations to prevent injury upon intrusion of personnel or body parts of personnel into an area with running and/or dangerous industrial equipment 142. Often, the transmitter unit 126 and receiver unit 130 are connected with a transmitter/receiver connecting cable 136. In other embodiments, the transmitter unit 126 and receiver unit 130 are connected wirelessly.

Transmitter units 126 and receiver units 130 are mounted on opposite sides of an opening and are arranged to transmit beams of light across the opening. The opening may be a doorway, an area between posts 140, or the like. Light curtains 124, in some embodiments, are set up around a perimeter of industrial equipment 142 in an open area of an industrial operation. The transmitter unit 126 and receiver unit 130 are typically mounted on rigid structures, such as walls, door frames, posts 140, bollards, etc. Precise alignment is required to avoid nuisance tripping. Alignment can often be difficult. An example of a light curtain 124 is model 450L GuardShield™ POC safety light curtains by Allen-Bradley®, which is one of several light curtains 124 available by Allen-Bradley. Other manufacturers sell other light curtains 124.

The light curtain 124 includes a transmitter unit 126 with a plurality of beam transmitters 128 arranged linearly on the transmitter unit 126. Each beam transmitter 128 is configured to transmit a narrow beam of light 134 to a corresponding beam receiver 132 on a receiver unit 130. In some embodiments, each beam transmitter 128 is a light emitting diode ("LED"). The beam transmitters 128, in some embodiments, include optics to focus a narrow beam of light 134. In other embodiments, the beam transmitters 128 are lasers. Typically, the beam transmitters 128 transmit light in a range that is not visible to humans. In some embodiments, the beam transmitters 128 transmit an infrared beam. In other embodiments, for safety each beam of light 134, the angle of divergence or the angle the beam of light 134 expands is no more than 2.5 degrees at the receiver unit 130.

The beam receivers 132 are configured to receive a beam of light 134 from a beam transmitter 128 and to measure an intensity of the received beam of light 134. In some embodiments, the beam receivers 132 are photo transistors or photoelectric cells that generate an electric signal in response to being exposed to light. In some embodiments, the beam receivers 132 produce a signal that indicates intensity of the received beam of light 134. The beam transmitters 128 and beam receivers 132 are depicted in FIG. 1 as surface mounted, but are typically mounted internally to a frame of the transmitter unit 126 and receiver unit 130. For example, the transmitter unit 126 and the receiver unit 130 may each include a metal frame, such as an aluminum frame and the beam transmitters 128 and beam receivers 132 are mounted internal to the metal frame, which includes openings for the beams of light 134, optics, etc. Typically, the beam receivers 132 are configured with the receiver unit 130 to exclude light other than from a corresponding beam transmitter 128.

In some embodiments, the beam transmitters 128 emit pulses of invisible infrared light. The light pulses, in some embodiments, are sequenced—one beam transmitter 128 after another. In other embodiments, the light pulses are modulated at a specific frequency and/or pattern, which may be used by a beam receiver 132 to distinguish light from a beam transmitter 128 from other sources.

Spacing of the beam transmitters 128 and corresponding beam receivers 132 depends on the application. Some standards define finger, hand and body spacing requirements where finger spacing is set up to not allow a human finger from penetrating the beam of light 134 without tripping the light curtain 124. Hand spacing is set up to not allow a human hand from penetrating the beam of light 134 without tripping the light curtain 124 and may be used where finger spacing requirements are not necessary. Body spacing is set up to not allow a human body part, such as an arm, a foot, etc. from penetrating the beam of light 134 without tripping the light curtain 124 and may be used where hand spacing requirements are not necessary. Typically, a light curtain 124 with body spacing is placed further from industrial equipment 142 than a light curtain 124 with hand spacing or finger spacing. Likewise, a light curtain 124 with hand spacing is typically placed further from industrial equipment 142 than a light curtain 124 with finger spacing.

Light curtains 124 are set up to transmit a trip signal in response to determining that a light intensity signal from any one of the beam receivers 132 of a receiver unit 130 is below a trip threshold. Typically, light intensity information of received light at a beam receiver of a light curtain is not available external to the light curtain. The light curtain 124 includes a light intensity transmitter that is configured to transmit, from the light curtain 124, a plurality of light intensity signals. Each light intensity signal from one or more beam receivers 132. In some embodiments, the light intensity transmitter is configured to transmit a light intensity signal from each beam receiver 132 of the receiver unit 130.

In other embodiments, the beam receivers 132 are grouped and the light intensity transmitter is configured to transmit a light intensity signal from each group of beam receiver 132. For example, a receiver unit 130 may include 30 beam receivers 132, which may be divided into groups of 5 consecutive beam receivers 132. The light intensity transmitter may then transmit a light intensity signal for each of the six groups of beam receivers 132 of the receiver unit 130. In some embodiments, the beam receivers 132 are split into groups that are sized with enough granularity to allow alignment while minimizing the number of light intensity signals transmitted by the light intensity transmitter.

In some embodiments, the light intensity transmitter transmits light intensity signals for processing by the intensity apparatus 102 to be displayed on an electronic display. For example, the light intensity transmitter may be located in the receiver unit 130 and may transmit the light intensity signals over the machine safety system to another portion of the intensity apparatus 102 in the controller 104, the safety relay 114 or other location for processing. The intensity apparatus 102 then displays or transmits for display a representation of the light intensities of the beam receivers 132 or groups of beam receivers 132. In some embodiments, the intensity apparatus 102 displays a representation of the light intensities of the beam receivers 132 or groups of beam receivers 132 on the HMI 106 or graphical user interface 108. In other embodiments, the intensity apparatus 102 displays a representation of the light intensities of the beam receivers 132 or groups of beam receivers 132 on the PED 144, which may be located close to the light curtain 124, which better facilitates alignment of the transmitter unit 126 and receiver unit 130.

In some embodiments, the light curtain 124 includes vibration sensors 138. The vibration sensors 138, in some embodiments, provide vibration information where vibration of the transmitter unit 126 and/or receiver unit 130 cause a degradation of the intensity of the beam of light 134 or a measured light intensity at the beam receivers 132. A small amount of vibration may cause a little degradation while increased vibration may cause a degradation of the light intensity signals at the beam receivers 132 to a degree that a trip transmitter transmits a trip signal. A known or expected amount of vibration may cause a known amount of degradation which may be accounted for during alignment. For example, where a light intensity signal has a range of 0 to 10 and expected vibration may cause a degradation value of 2 and a trip threshold is 4, the intensity apparatus 102 may be used so that each beam receiver 132 has a light intensity signal of 6 or greater.

In some embodiments, the vibration sensors 138 are an accelerometer-type vibration sensor, a pin and spring vibration sensor, a piezoelectric vibration sensor, a magnetic vibration sensor, or the like. In some embodiments, the vibration sensors 138 are mounted internal to the transmitter unit 126 and/or receiver unit 130. In other embodiments, the vibration sensors 138 are mounted on an exterior of the transmitter unit 126 and/or receiver unit 130. In some embodiments, vibration information from the vibration sensors 138 is processed, transmitted, etc. by the light curtain 124. In other embodiments, the vibration information from the vibration sensors 138 is transmitted separately from data of the light curtain 124. For example, the vibration sensors 138 may be connected to a connection tap 118 and vibration information may be transmitted to the safety relay 114 separately from data from the light curtain 124. One of skill in the art will recognize other ways for the intensity apparatus 102 to receive vibration information from the vibration sensors 138.

The system 100 includes a portable electronic device ("PED") 144 configured to receive the plurality of light intensity signals and to display a light intensity display indicator for each light intensity signal along with a relative position of the one or more beam receivers 132 associated with each light intensity signal. The light intensity indicators for each light intensity signal and the corresponding positions of the one or more beam receivers provide an indication of beam alignment.

In some embodiments, the PED 144 is a cellular phone, a personal digital assistant ("PDA"), a tablet computer or the like. In some embodiments, the PED 144 is a consumer electronic device used for other purposes and includes program code and hardware circuits to receive the plurality of light intensity signals and to display the light intensity signals. In other embodiments, the PED 144 is a custom device designed for light curtain alignment. In some embodiments, the PED 144 receives the light intensity signals wirelessly. In other embodiments, the PED 144 is connected to the light curtain 124 with a wire. For example, the PED 144 may connect to the light curtain 124 with a cord with a connector on between the PED 144 and cord and between the light curtain 124 and cord.

Figure 2:
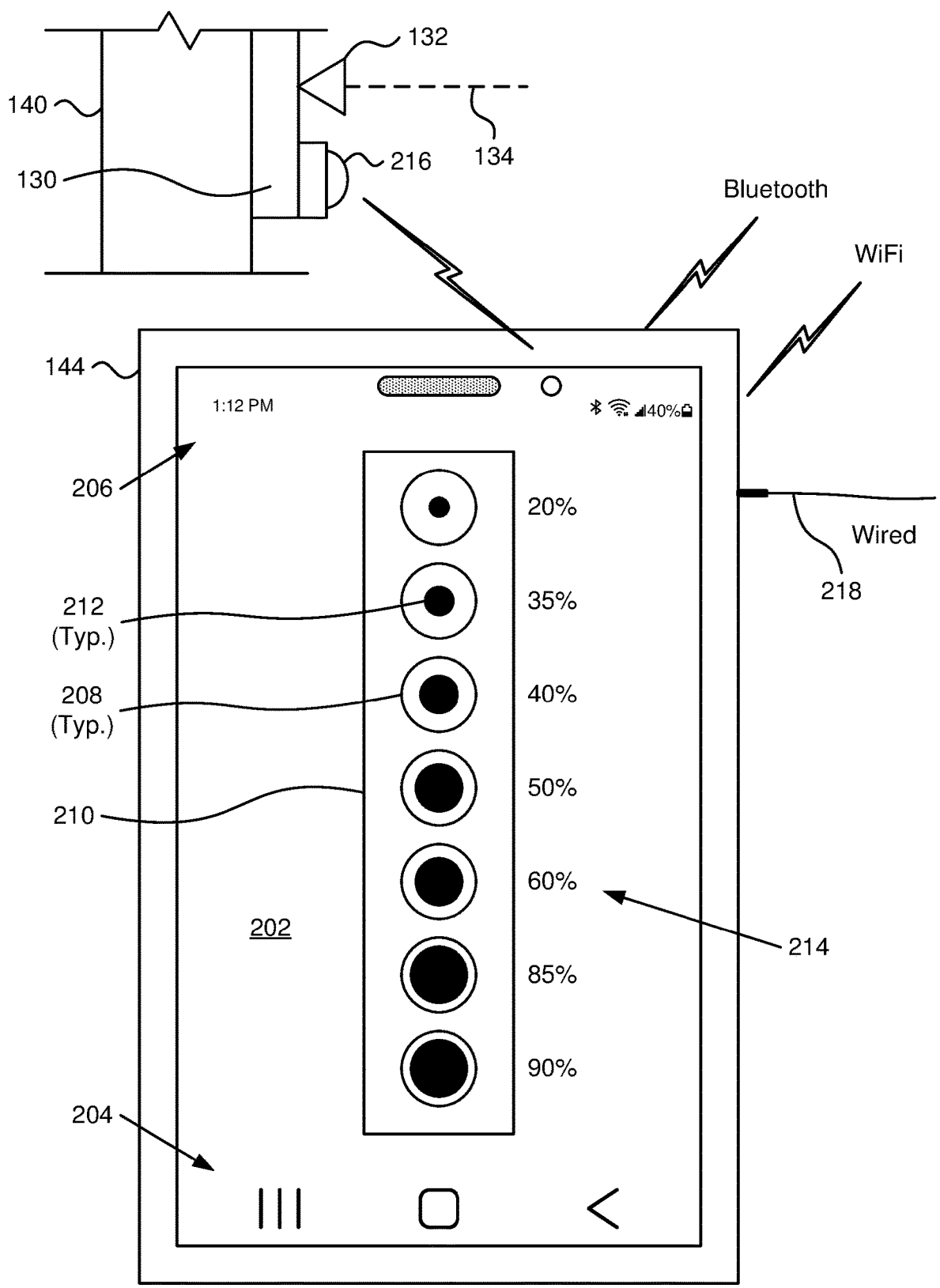
FIG. 2 is a schematic block diagram for a portable electronic device for light curtain beam alignment according to an embodiment.

FIG. 2 is a schematic block diagram for a PED 144 for light curtain beam alignment according to an embodiment. The PED 144 in FIG. 2 is depicted as a cellular phone with an electronic display 202, but may be another device with an electronic display 202. The electronic display 202 includes controls 204 at the bottom and status indicators 206 at the top of the electronic display. The PED 144 includes circles 208 that represent beam receivers 132 and rectangle 210 that represents the receiver unit 130. Each circle 208 includes a dot 212 where the size of the dots 212 relative to the circles 208 represent an intensity of a light intensity signal. Numbers 214 next to the circles 208 indicate an intensity value so that the top circle 208 has an intensity value of 20 percent of a maximum intensity and the bottom circle 208 has an intensity value of 90 percent of the maximum intensity.

In the example of FIG. 2, the beam receiver 132 and corresponding beam transmitter 128 at the top of the receiver unit 130 and transmitter unit 126 have a much lower alignment than the beam receiver 132 and corresponding beam transmitter 128 at the bottom of the receiver unit 130 and transmitter unit 126. As the top of the receiver unit 130 and transmitter unit 126 are brought more into alignment, the beam intensities at the top of the beam intensity would increase. The representation of beam intensities in FIG. 2 depict one embodiment and one of skill in the art will recognize other ways to represent intensities of light intensity signals from the plurality of beam receivers 132 on a receiver unit 130.

The PED 144 is depicted with various ways to receive light intensity signals. In one embodiment, the PED 144 receives the light intensity signals wirelessly over a wireless network, such as WiFi. In another embodiment, the PED 144 receives the light intensity signals wirelessly over a short range wireless network, such as Bluetooth®. In another embodiment, the receiver unit 130 or transmitter unit 126 include an infrared transmitter 216 and the PED 144 includes camera or other device capable of communicating with the infrared transmitter 216 using infrared signals. In another embodiment, the PED 144 includes a cord 218 with a jack that connects to the light curtain 124 to receive the light intensity signals. Having a wireless or tethered PED 144 provides a convenient way for a user aligning the transmitter unit 126 and receiver unit 130 of a light curtain 124 while the user is close enough to physically adjust the transmitter unit 126 and receiver unit 130.

Figure 3:
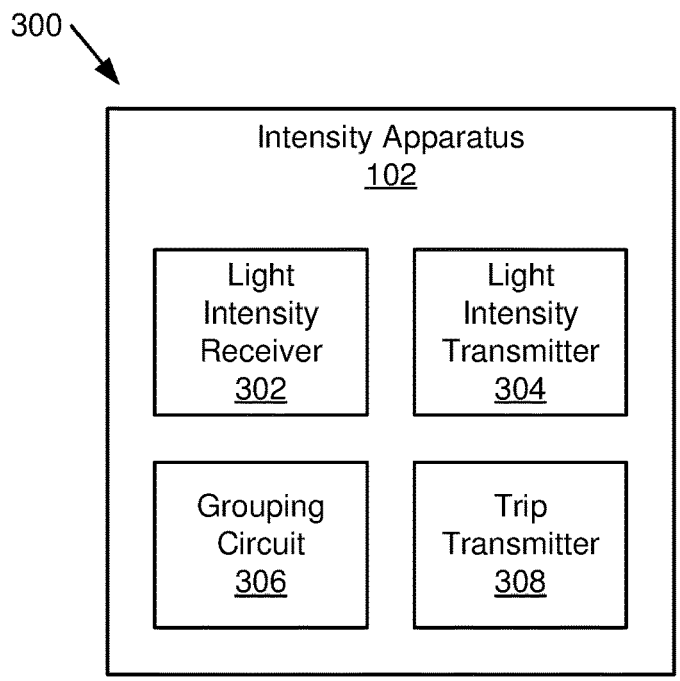
FIG. 3 is a schematic block diagram of an apparatus for light curtain beam alignment according to an embodiment.

FIG. 3 is a schematic block diagram of an apparatus 300 for light curtain beam alignment according to an embodiment. The apparatus 300 includes an embodiment of the intensity apparatus 102 that includes a light intensity receiver 302, a light intensity transmitter 304, a grouping circuit 306 and a trip transmitter 308, which are described below.

The apparatus 300 includes light intensity receiver 302 configured to receive a plurality of light intensity signals from the plurality of beam receivers 132 on the receiver unit 130 of the light curtain 124. In one embodiment, the light intensity receiver 302 receives the light intensity signals from each beam receiver 132. In one embodiment, the light intensity receiver 302 is electrically connected to each beam receiver 132. In another embodiment, the light intensity receiver 302 is connected to a group of beam receivers 302 where the receiver unit 130 includes a plurality of groups of beam receivers 132. In some embodiments, the intensity apparatus 102 is used for determining if the light curtain 124 has tripped based on a blocked beam of light 134 in addition to transmission of several light intensity signals. In other embodiments, the light intensity receiver 302 and light intensity transmitter 304 are independent of a trip function of the light curtain 124.

The apparatus 300 includes a light intensity transmitter 304 configured to transmit, from the light curtain 124, the plurality of light intensity signals received by the light intensity receiver 302. Each light intensity signal is from one or more beam receivers 132 of the plurality of beam receivers 132 of the receiver unit 130. For example, received light intensity signals may be grouped. In one embodiment, the light intensity transmitter 304 transmits the light intensity signals over a tap conductor 120 to the safety relay 114. In another embodiment, the light intensity transmitter 304 transmits the light intensity signals to the PED 144 or other display, such as in the HMI 106 or graphical user interface 108. In other embodiments, the safety relay 114 transmits the light intensity signals to the controller 104 through the network interface 116. The controller 104 or other device may use the light intensity signals to monitor long-term degradation of the light intensity signals.

In other embodiments, the controller 104 or other device transmits the light intensity signals to the PED 144 using a standard transmission protocol, such as transmission control protocol/internet protocol ("TCP/IP"), ethernet, etc. For example, the controller 104 may transmit the light intensity signals over the computer network 110, which may include a LAN, the Internet, a cellular network, etc. to the PED 144. In other embodiments, the light intensity transmitter 304 transmits the light intensity signals in a more direct path using Bluetooth®, near field communication ("NFC"), infrared transmission, etc. One of skill in the art will recognize other ways for the light intensity transmitter 304 to transmit the light intensity signals.

In some embodiments, the light intensity transmitter 304 transmits a light intensity signal for each beam receiver 132. In another embodiment, the light intensity transmitter 304 transmits an intensity signal for each group of beam receivers 132 where the beam receivers 132 are divided into several groups. In one embodiment, the intensity apparatus 102 includes a grouping circuit 306 configured to receive a light intensity signal from two or more beam receivers 132 of a group of beam receivers 132 of the receiver unit 130. For example, where the receiver unit 130 has 40 beam receivers 132, the beam receivers 132 may be divided into eight groups of five beam receivers 132 so that the grouping circuit 306 receives, for each group, light intensity signals from five beam receivers 132 and outputs a single light intensity signal for the group.

In one embodiment, the grouping circuit 306 averages the light intensity signals from the five beam receivers 132 in the group and outputs for to the light intensity transmitter 304 an averaged light intensity signal. In another embodiment, the grouping circuit 306 receives five light intensity signals from five beam receivers 132 of a group and transmits a light intensity signal that is the lowest of the group. For example, if the grouping circuit 306 receives light intensity signals of 21, 23, 20, 19 and 25, the grouping circuit 306 outputs to the light intensity transmitter 304 a light intensity signal with a value of 19. One of skill in the art will recognize other ways for the grouping circuit 306 to combine light intensity signals from a group of beam receivers 132.

The apparatus 300 includes, in some embodiments, a trip transmitter 308 configured to transmit a trip signal in response to determining that a light intensity signal from a beam receiver 132 of the plurality of beam receivers 132 is below a trip threshold. Typically, the trip transmitter 308 transmits the trip signal if a light intensity signal for any of the beam receivers 132 of the receiver unit 130 is below the trip threshold, which indicates that the beam of light 134 transmitted from a corresponding beam transmitter 128 is fully or partially blocked. Depending on what is blocking the beams of light 134, multiple beams of light 134 may be blocked causing the light intensity signal from several beam receivers 132 to fall below a trip threshold.

The trip threshold, in some embodiments, is dependent on a maximum expected beam intensity from a beam receiver 132. For example, the trip threshold may be set to a percentage of the maximum beam intensity for the beam receiver 132. In some embodiments, the trip threshold is set according to a safety standard. In other embodiments, the trip threshold may be adjusted within a range where there is a minimum allowable trip threshold. One of skill in the art will recognize other ways to set a trip threshold. In some embodiments, the intensity apparatus 102 includes the trip transmitter 308. In other embodiments, determining if a light intensity signal is below a trip threshold and transmitting a trip signal is external to the intensity apparatus 102.

Figure 4:
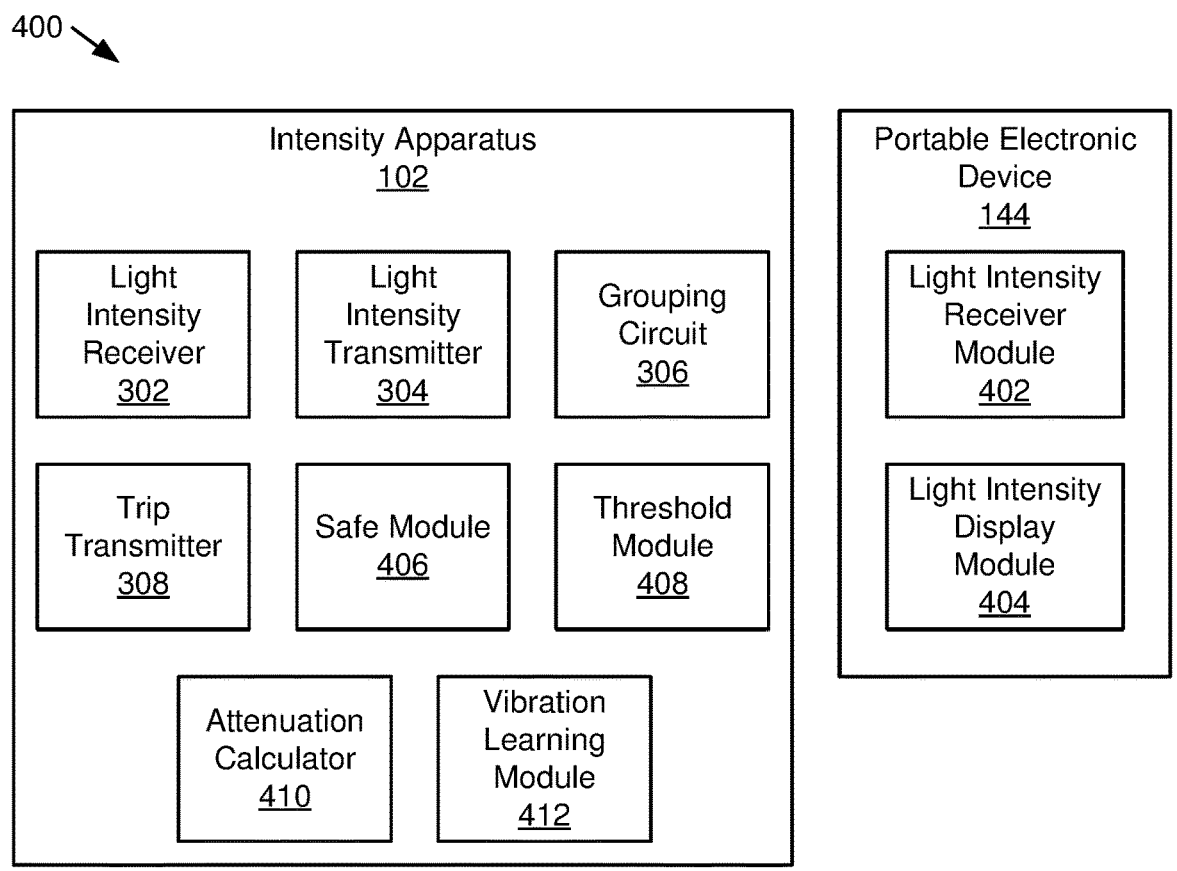
FIG. 4 is a schematic block diagram of an apparatus and portable electronic device for light curtain beam alignment according to another embodiment.

FIG. 4 is a schematic block diagram of an apparatus 400 and portable electronic device for light curtain beam alignment according to another embodiment. The apparatus 400 includes another embodiment of an intensity apparatus 102 and/or an embodiment of the PED 144. The embodiment of the intensity apparatus 102 includes a light intensity receiver 302, a light intensity transmitter 304, a grouping circuit 306, and/or a trip transmitter 308, which are substantially similar to those described above with regard to the apparatus 300 of FIG. 3. The PED 144 includes a light intensity receiver module 402 and a light intensity display module 404 and the intensity apparatus 102 includes one or more of a safe module 406, a threshold module 408, an attenuation calculator 410 and a vibration learning module 412, which are described below.

The PED 144 includes a light intensity receiver module 402 configured to receive the plurality of light intensity signals and a light intensity display module 404 configured to display a light intensity indicator for each light intensity signal and a relative position of the one or more beam receivers 132 associated with each light intensity signal. The light intensity indicators for each light intensity signal and corresponding positions of the one or more beam receivers 132 provide an indication of beam alignment. In some embodiments, the light intensity receiver module 402 and the light intensity display module 404 are program code stored in computer readable storage media on the PED 144. In other embodiments, the light intensity receiver module 402 and the light intensity display module 404 are implemented in the PED 144 in another way, such with a programmable hardware device, for example, where the PED 144 is a custom device for use with the light curtain 124.

In some embodiments, the light intensity signals received by the light intensity receiver module 402 are in a different form than the light intensity signals received by the light intensity receiver 302 in the intensity apparatus 102. For example, the light intensity signals received by the light intensity receiver 302 may be analog signals or digital signal where the light intensity signals received by the light intensity receiver module 402 may be data packets that represent the analog signals received by the light intensity receiver 302. In other embodiments, the light intensity signals received by the light intensity receiver module 402 may be conditioned, proportioned, transformed or varied in some way to be compatible with the PED 144.

The light intensity display module 404 displays the light intensity signals of the beam receivers or of groups of beam receivers in such a way that a user is able to ascertain which portion of the transmitter unit 126 and receiver unit 130 of the light curtain 124 are out of alignment, and in some embodiments, by how much the transmitter unit 126 and the receiver unit 130 are out of alignment. In some embodiments, the light intensity display module 404 changes the display of the light intensity signals fast enough to provide real time display of intensities of the light intensity signals.

In some embodiments, the light intensity display module 404 displays the light intensity indicators for each light intensity signal as indicated in FIG. 2. The light intensity display module 404, in various embodiments, displays the light intensity indicators for each light intensity signal using a graph, a list of light intensities, a bar chart, a representation of the receiver unit 130, or other display capable of conveying an indication of beam alignment of the receiver unit 130 and the transmitter unit 126 of the light curtain 124.

The apparatus 102, in some embodiments, includes a safe module 406 configured to prevent the trip transmitter 308 or similar function of the light curtain 124 from transmitting the trip signal during a safe mode. In some examples, the safe module 406 sets the safe mode in response to a user instruction. For example, a user may set the safe mode while the transmitter unit 126 and the receiver unit 130 are being aligned, serviced, or the like. In one embodiment, the safe module 406 is configured to activate the light intensity transmitter 304 to transmit the plurality of light intensity signals during the safe mode. In the embodiment, the light intensity transmitter 304 does not transmit the plurality of light intensity signals when not in safe mode, for example, during an operation mode so that the light intensity transmitter 304 and the trip transmitter 308 operate simultaneously during the operation mode. In other embodiments, the light intensity transmitter 304 transmits the plurality light intensity signals in safe mode and when not in safe mode and the safe module 406 merely controls transmitting of the trip signal. In some embodiments, the light intensity transmitter 304 periodically transmits the plurality light intensity signals.

The intensity apparatus 102, in some embodiments, includes a threshold module 408 configured to notify a user adjusting positioning of the transmitter unit 126 and/or the receiver unit 130 of a target threshold for each of the plurality of beam receivers 132 of the receiver unit 130. The target threshold includes the trip threshold adjusted by an amount of light intensity degradation due to an expected amount of vibration at the transmitter unit 126 and/or the receiver unit 130. The light intensity signals are affected to some degree by vibrations in the transmitter unit 126 and the receiver unit 130. For example, vibration of the transmitter unit 126 causes movement of the beam transmitters 128, which affects the beams of light 134 transmitted by the beam transmitters 128.

In some cases, the vibrations may be severe enough so that the beam of light 134 transmitted by a beam transmitter 132 moves from an aligned position to a position where no light of the beam of light 134 is received by the corresponded beam receiver 132. The frequency of the vibration may then cause the beam of light 134 to shine on the corresponding beam receiver 132 only a percentage of the time, which will affect light intensity sensed by the beam receiver 132. In less extreme situations, the vibrations may only partially misalign the beam of light 134 with the beam receiver 132, which would cause less light intensity degradation. If the vibration frequency is low enough, a temporary misalignment of the beam of light 134 may cause the light intensity signal from the beam receiver 132 to drop below the trip threshold.

In other situations, vibration at the receiver unit 130 causes movement of the beam receivers 132, which may also cause some degradation of the light intensity signal from the beam receivers 132. The threshold module 408 accounts for the degradation of the light intensity signals of the beam receivers 132 during alignment. For example, on a light intensity scale from 0 to 10, the trip threshold may be set to 3 and an expected amount of light intensity degradation may be 3 so that alignment of the transmitter unit 126 and the receiver unit 130 should be such that the plurality of light intensity signals should be above 6. Typically, alignment should include a safety margin of light intensity above the trip threshold. Where the safety margin is 2 and the threshold module 408 setting the target threshold at 6, a user would continue to align the light curtain 124 until the light intensity signals are above 8. Over time, the beam transmitters 128 and the beam receivers 132 may degrade due to age, use, etc. Having a safety margin allows for the degradation.

In some embodiments, light intensity signals transmitted by the light intensity transmitter 304 of the intensity apparatus 102 may be used to track degradation of the beam transmitters 128 and the beam receivers 132. In some embodiments, the threshold module 408 may indicate that the light intensity degradation is too high for alignment so the user may need to take steps to dampen vibrations at the light curtain 124. In some embodiments, the threshold module 408 receives an amount of light intensity degradation from a user. For example, a user may measure vibration at the light curtain 124 and may calculate and amount of expected light intensity degradation.

In some embodiments, the intensity apparatus 102 includes an attenuation calculator 410 configured to determine the amount of light intensity degradation for each of the plurality of beam receivers 132 due to vibration of the light curtain 124. In some embodiments, the attenuation calculator 410 correlates vibration amplitude and/or vibration frequency with light intensity degradation and determines the amount of light intensity degradation from an expected amount of vibration and/or measured vibration at the light curtain 124. In some embodiments, the attenuation calculator 410 is configured to determine the amount of light intensity degradation based on light intensity signals from the light intensity receiver 302 and operational data of equipment near the light curtain 124 causing vibrations to the light curtain 124.

In other embodiments, the light curtain 124 includes one or more vibration sensors 138. In some examples, the light curtain 124 includes a vibration sensor 138 in or at the transmitter unit 126. In other embodiments, the light curtain 124 includes a vibration sensor 138 in or at the receiver unit 130. In some embodiments, the attenuation calculator 410 is configured to use sensed vibration in the transmitter unit 126 and/or in the receiver unit 130 to determine the amount of light intensity degradation for each of the plurality of beam receivers 132 due to vibration of the light curtain 124. For example, the sensed vibration may be from the vibration sensor(s) 138. In some embodiments, the attenuation calculator 410 uses light intensity signal strength during periods of little or no vibration, may be during shutdown of equipment around the light curtain 124, and light intensity signal strength during periods of measured vibration to determine the light intensity degradation.

In some embodiments, the intensity apparatus 102 includes a vibration learning module 412 configured to use vibration data and light intensity signal data for transmitter units 126 and receiver units 132 of a plurality of light curtains 124 to determine a relationship between vibration and light intensity degradation. In some embodiments, the attenuation calculator is configured to use the relationship determined by the vibration learning module 412 to determine the amount of light intensity degradation based on the vibration of the light curtain 124. In some examples, the vibration learning module 412 uses machine learning to derive relationships between vibration data and light intensity degradation.

For instance, the vibration learning module 412 may use measured light intensity during periods where vibration is low or non-existent, perhaps during a period where the industrial operation and/or the industrial equipment 142 is shut down, and may use measured light intensity during periods of vibration, may be when equipment around the light curtain 124 is operating, to determine an amount of light intensity degradation. The vibration learning module 412, in some examples, correlates various vibration intensities and/or vibrational frequencies with corresponding measured light intensity degradation to derive a correlation between vibration information and light intensity degradation. One of skill in the art will recognize other ways for the vibration learning module 412 to use vibration data and light intensity signal data to determine a relationship between vibration and light intensity degradation.

Figure 5:
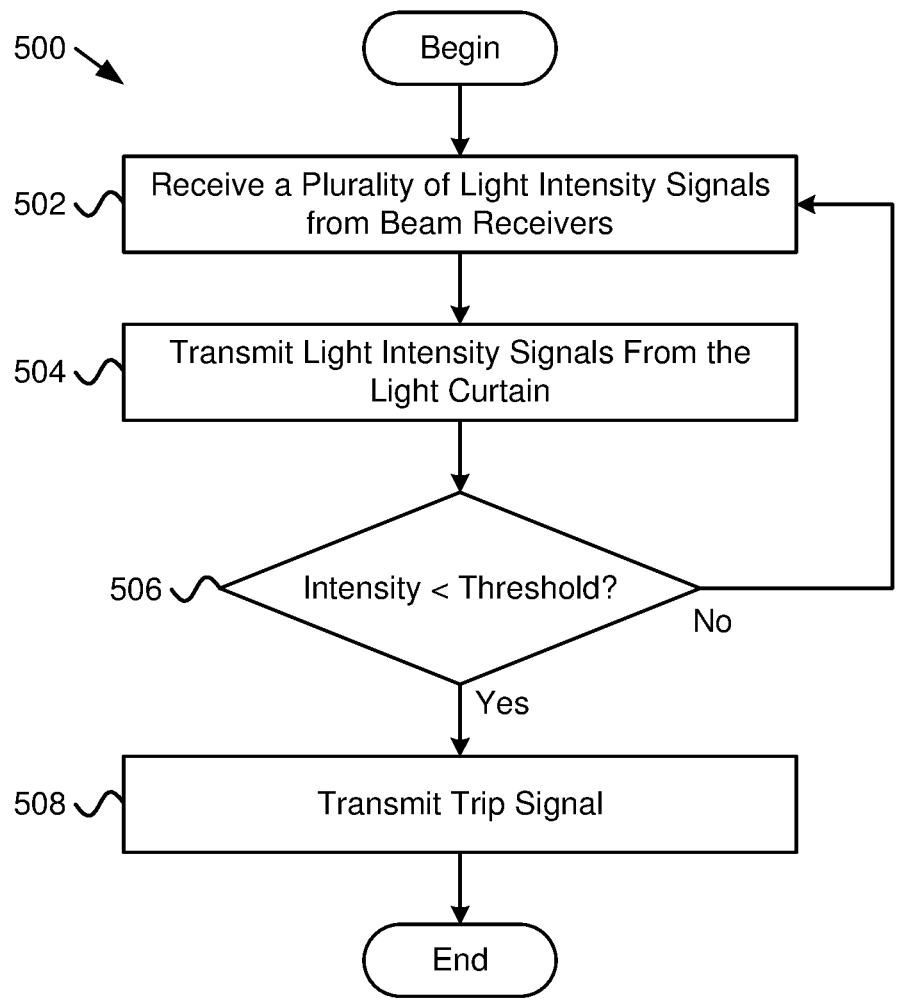
FIG. 5 is a flowchart diagram of a method for light curtain beam alignment according to an embodiment.

FIG. 5 is a flowchart diagram of a method 500 for light curtain beam alignment according to an embodiment. The method 500 begins and receives 502 a plurality of light intensity signals where each light intensity signal is from one or more beam receivers 132 of a plurality of beam receivers 132 of a light curtain 124. The light curtain 124 includes a transmitter unit 126 that includes a plurality of beam transmitters 128 arranged linearly on the transmitter unit 126. Each beam transmitter 128 is configured to transmit a narrow beam of light 134. The light curtain 124 includes a receiver unit 130 that includes the plurality of beam receivers 132 arranged linearly. Each beam receiver 132 is configured to receive light from a corresponding beam transmitter 128 of the plurality of beam transmitters 128. The method 500 transmits 504 from the light curtain 124 the plurality of light intensity signals.

In some embodiments, the method 500 determines 506 if a light intensity signal from a beam receiver 132 is below a trip threshold. If the method 500 determines 506 that no light intensity signal from a beam receiver 132 is below the trip threshold, the method 500 returns and receives 502 the plurality of light intensity signals. If the method 500 determines 506 that any one of the light intensity signals from a beam receiver 132 is below the trip threshold, the method 500 transmits 508 a trip signal, and the method 500 ends. In various embodiments, the method 500 is implemented using one or more of the light intensity receiver 302, the light intensity transmitter 304, the grouping circuit 306 and the trip transmitter 308.

Figure 6:
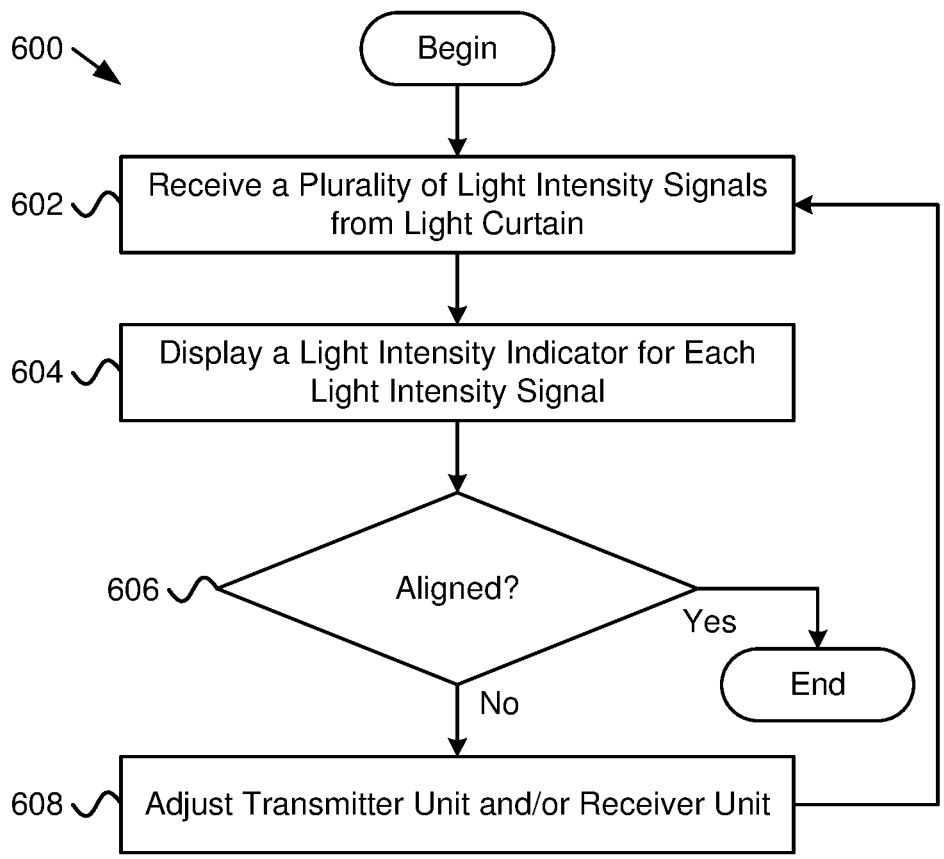
FIG. 6 is a flowchart diagram of a method for light curtain beam alignment using a portable electronic device according to an embodiment.

FIG. 6 is a flowchart diagram of a method 600 for light curtain beam alignment using a portable electronic device according to an embodiment. The method 600 begins and receives 602, at a PED 144, the plurality of light intensity signals and displays 604 a light intensity indicator for each light intensity signal and a relative position of the one or more beam receivers 132 associated with each light intensity signal. The light intensity indicators for each light intensity signal and corresponding positions of the one or more beam receivers provide an indication of beam alignment.

The method 600, in some embodiments, determines 606 if the transmitter unit 126 and the receiver unit 130 are aligned. If the method 600 determines 606 that the transmitter unit 126 and the receiver unit 130 are not aligned, the method 600 directs a user to adjust 608 the transmitter unit 126 and/or the receiver unit 130. For example, the method 600 directs a user to adjust 608 the transmitter unit 126 and/or the receiver unit 130 by displaying that some of the light intensity signals are below a desired amount. If the method 600 determines 606 that the transmitter unit 126 and the receiver unit 130 are aligned, the method 600 ends. In various embodiments, the method 600 is implemented using one or both of the light intensity receiver module 402 and the light intensity display module 404.

Figure 7:
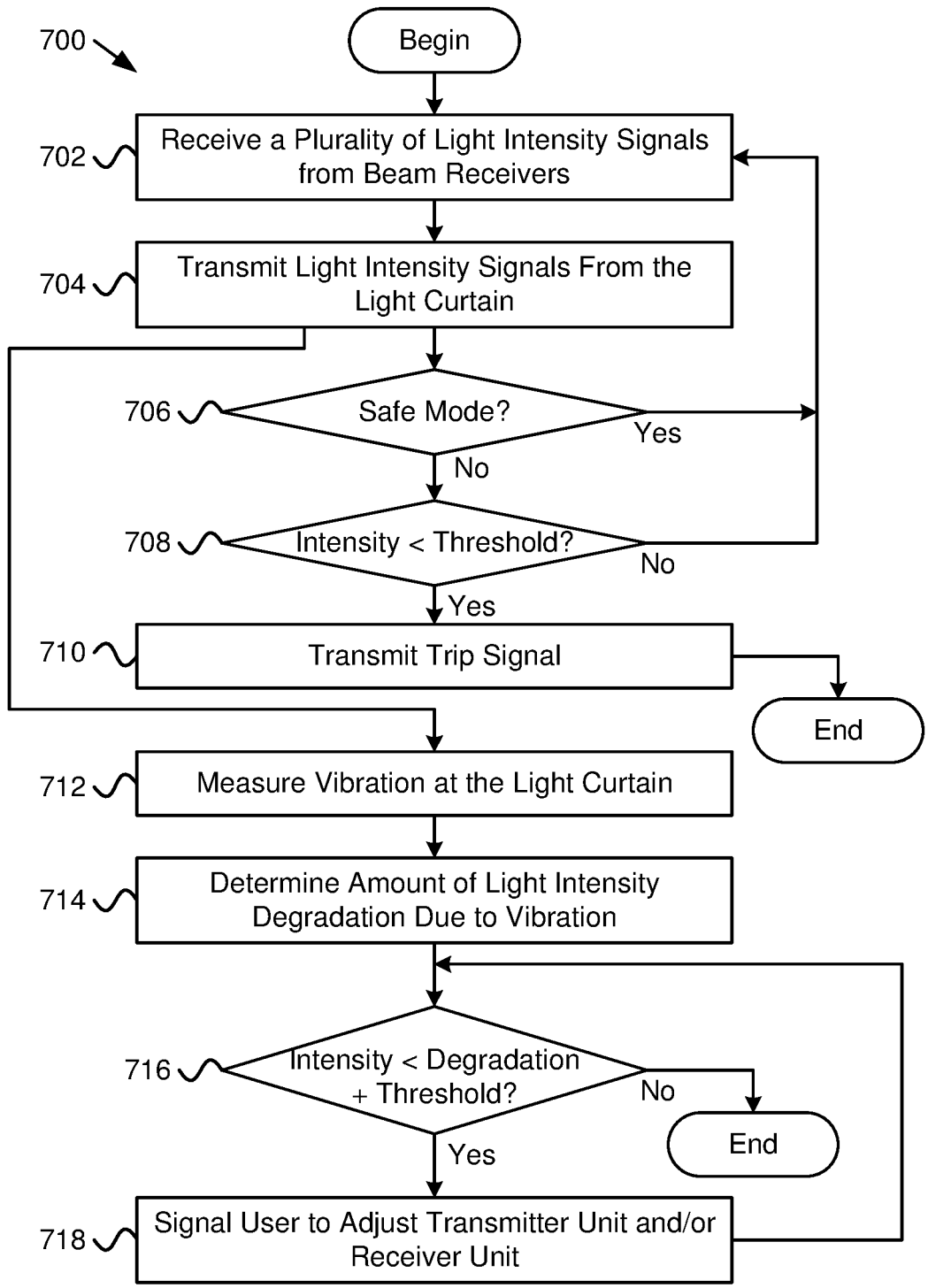
FIG. 7 is a flowchart diagram of a method for light curtain beam alignment with vibration data according to an embodiment.

FIG. 7 is a flowchart diagram of a method 700 for light curtain beam alignment with vibration data according to an embodiment. The method 700 begins and receives 702 a plurality of light intensity signals where each light intensity signal is from one or more beam receivers 132 of a plurality of beam receivers 132 of a light curtain 124. The light curtain 124 includes a transmitter unit 126 that includes a plurality of beam transmitters 128 arranged linearly on the transmitter unit 126. Each beam transmitter 128 is configured to transmit a narrow beam of light 134. The light curtain 124 includes a receiver unit 130 that includes the plurality of beam receivers 132 arranged linearly. Each beam receiver 132 is configured to receive light from a corresponding beam transmitter 128 of the plurality of beam transmitters 128. The method 700 transmits 704 from the light curtain 124 the plurality of light intensity signals.

The method 700 determines 706 if the light curtain 124 is in a safe mode. If the method 700 determines 706 that the light curtain 124 is not in a safe mode, the method 700 returns and receives 702 a plurality of light intensity signals. If the method 700 determines 706 that the light curtain 124 is in a safe mode, the method 700 determines 708 if a light intensity signal from a beam receiver 132 is below a trip threshold. If the method 700 determines 708 that no light intensity signal from a beam receiver 132 is below the trip threshold, the method 700 returns and receives 702 the plurality of light intensity signals. If the method 700 determines 708 that any one of the light intensity signals from a beam receiver 132 is below the trip threshold, the method 700 transmits 710 a trip signal, and the method 700 ends.

The method 700 measures 712 vibration at the light curtain 124, for example, using the vibration sensors 138, and determines 714 an amount of light intensity degradation due to the measured vibration. In some embodiments, the method 700 uses information from the vibration learning module 412 to determine 714 the amount of light intensity degradation. The method 700 determines 716 if an light intensity from the plurality of light intensity signals from the beam receivers 132 minus the amount of light intensity degradation is below a trip threshold. In some embodiments, the method 700 includes an additional safety margin with the light intensity degradation.

If the method 700 determines 716 that an light intensity from the plurality of light intensity signals from the beam receivers 132 minus the amount of light intensity degradation is below a trip threshold, the method 700 signals 718 a user to adjust alignment of the transmitter unit 126 and/or receiver unit 130, for example, by displaying light intensity information, light intensity degradation, a safety margin, a trip threshold, etc. on the PED 144. If the method 700 determines 716 that an light intensity from the plurality of light intensity signals from the beam receivers 132 minus the amount of light intensity degradation is not below a trip threshold, the method 700 ends. In various embodiments, the method 700 is implemented using one or more of the light intensity receiver 302, the light intensity transmitter 304, the grouping circuit 306, the trip transmitter 308, the light intensity receiver module 402, the light intensity display module 404, the safe module 406, the threshold module 408, the attenuation calculator 410 and the vibration learning module 412.

Figure 8:
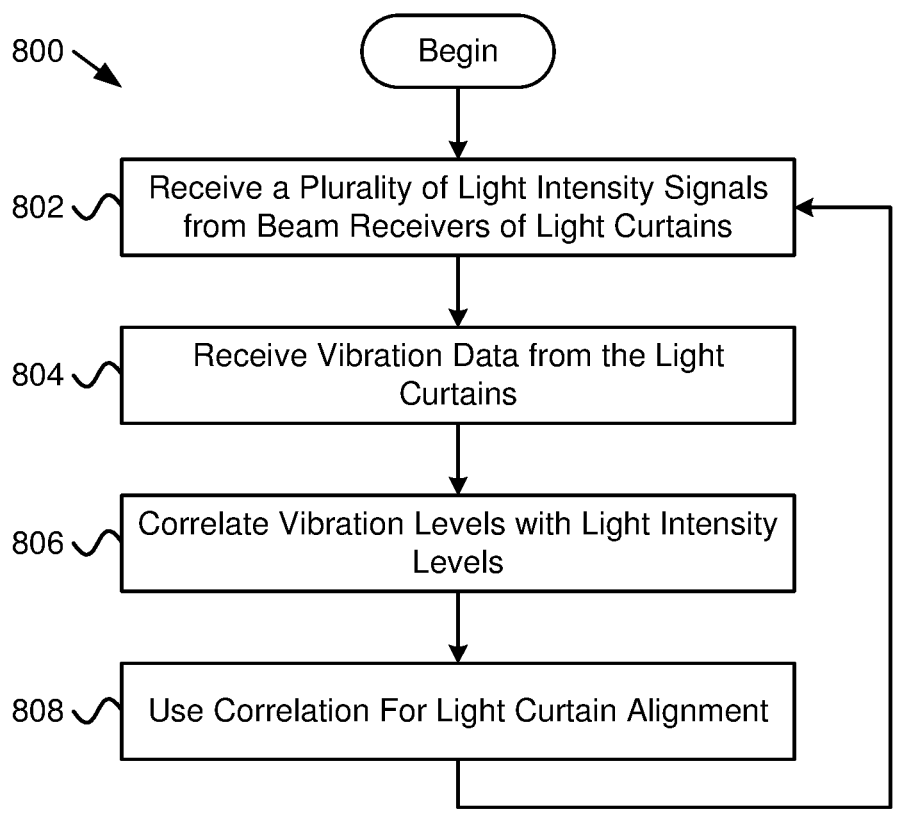
FIG. 8 is a flowchart diagram of a method for correlating light intensity data for a plurality of light curtains with vibration data from the light curtains for use in beam alignment of a light curtain according to an embodiment.

FIG. 8 is a flowchart diagram of a method 800 for correlating light intensity data for a plurality of light curtains 124 with vibration data from the light curtains 124 for use in beam alignment of a light curtain 124 according to an embodiment. The method 500 begins and receives 802 a plurality of light intensity signal data from beam receivers 132 of light curtains 124 and receives 804 corresponding vibration information from the light curtains 124. The method 800 correlates 806 vibration levels with light intensity levels from the beam receivers 132 and uses 808 the correlation for light curtain alignment. The method 800 returns and continues to receive 802 additional light intensity signal data from beam receivers 132 of the same or additional light curtains 124 and receives 804 corresponding vibration information from the light curtains 124. In various embodiments, the method 800 is implemented using one or more of light intensity receivers 302, light intensity transmitters 304, grouping circuits 306, and the attenuation calculators 410 from various light curtains 124 and the vibration learning module 412.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component comprising:
    a light intensity receiver configured to receive a plurality of light intensity signals from a plurality of beam receivers of a receiver unit of a light curtain, the light curtain comprising:
        a transmitter unit comprising a plurality of beam transmitters arranged linearly on the transmitter unit, each beam transmitter configured to transmit a narrow beam of light; and
        the receiver unit comprising the plurality of beam receivers arranged linearly, each beam receiver configured to receive light from a corresponding beam transmitter of the plurality of beam transmitters;
    a light intensity transmitter configured to transmit, from the light curtain, the plurality of light intensity signals received by the light intensity receiver, each light intensity signal from one or more beam receivers of the plurality of beam receivers; and
    a trip transmitter configured to transmit a trip signal in response to determining that a light intensity signal from a beam receiver of the plurality of beam receivers is below a trip threshold.

2. The component of claim 1, further comprising:
    a light intensity receiver module configured to receive the plurality of light intensity signals; and
    a light intensity display module configured to display a light intensity indicator for each light intensity signal of the plurality of light intensity signals and a relative position of the one or more beam receivers associated with each light intensity signal of the plurality of light intensity signals, wherein the light intensity indicators for each light intensity signal and corresponding positions of the one or more beam receivers provide an indication of beam alignment.

3. The component of claim 2, wherein the light intensity receiver module and the light intensity display module are on a portable electronic device.

4. The component of claim 3, wherein the plurality of light intensity signals are transmitted to the portable electronic device wirelessly.

5. The component of claim 1, further comprising a safe module configured to prevent the trip transmitter from transmitting the trip signal during a safe mode.

6. The component of claim 5, wherein the safe module is configured to activate the light intensity transmitter to transmit the plurality of light intensity signals during the safe mode.

7. The component of claim 1, wherein the light intensity transmitter and the trip transmitter operate simultaneously during an operation mode.

8. The component of claim 7, wherein the light intensity transmitter transmits the plurality of light intensity signals while the trip transmitter monitors the plurality of light intensity signals to determine if a light intensity signal from a beam receiver of the plurality of beam receivers drops below the trip threshold which triggers the trip transmitter to transmit the trip signal.

9. The component of claim 1, further comprising a threshold module configured to notify a user adjusting positioning of the transmitter unit and/or the receiver unit of a target threshold for each of the plurality of beam receivers, wherein the target threshold comprises the trip threshold adjusted by an amount of light intensity degradation due to an expected amount of vibration at the transmitter unit and/or the receiver unit.

10. The component of claim 9, further comprising an attenuation calculator configured to determine the amount of light intensity degradation for each of the plurality of beam receivers due to vibration of the light curtain.

11. The component of claim 10, wherein the attenuation calculator is configured to determine the amount of light intensity degradation based on light intensity signals from the light intensity receiver and operational data of equipment near the light curtain causing vibrations to the light curtain.

12. The component of claim 10, further comprising a vibration sensor in the transmitter unit and/or a vibration sensor in the receiver unit of the light curtain, wherein the attenuation calculator is configured to use sensed vibration in the transmitter unit and/or in the receiver unit to determine the amount of light intensity degradation for each of the plurality of beam receivers due to vibration of the light curtain.

13. The component of claim 12, further comprising a vibration learning module configured to use vibration data and light intensity signal data for transmitter units and receiver units of a plurality of light curtains to determine a relationship between vibration and light intensity degradation, wherein the attenuation calculator is configured to use the relationship determined by the vibration learning module to determine the amount of light intensity degradation based on the vibration of the light curtain.

14. A component comprising:
    a light intensity receiver configured to receive a plurality of light intensity signals from a plurality of beam receivers of a receiver unit of a light curtain, the light curtain comprising:
        a transmitter unit comprising a plurality of beam transmitters arranged linearly on the transmitter unit, each beam transmitter configured to transmit a narrow beam of light;
        the receiver unit comprising the plurality of beam receivers arranged linearly, each beam receiver configured to receive light from a corresponding beam transmitter of the plurality of beam transmitters; and
        one or more vibration sensors;

a light intensity transmitter configured to transmit from the light curtain a plurality of light intensity signals, each light intensity signal from one or more beam receivers; and a trip transmitter that transmits a trip signal in response to determining that a light intensity signal from a beam receiver of the plurality of beam receivers is below a trip threshold.

15. The component of claim 14, wherein the one or more vibration sensors comprise a vibration sensor in the transmitter unit and/or a vibration sensor in the receiver unit.

16. The component of claim 14, further comprising an attenuation calculator configured to determine an amount of light intensity degradation for each of the plurality of beam receivers due to vibration of the light curtain sensed by the one or more vibration sensors.

17. The component of claim 16, further comprising a threshold module that notifies a user adjusting positioning of the transmitter unit and/or the receiver unit of a target threshold for each of the plurality of beam receivers, wherein the target threshold comprises the trip threshold adjusted by an amount of light intensity degradation determined by the attenuation calculator.

18. A method comprising:

receiving a plurality of light intensity signals, each light intensity signal from one or more beam receivers of a plurality of beam receivers of a light curtain, the light curtain comprising:

a transmitter unit comprising a plurality of beam transmitters arranged linearly on the transmitter unit, each beam transmitter configured to transmit a narrow beam of light; and a receiver unit comprising the plurality of beam receivers arranged linearly, each beam receiver configured to receive light from a corresponding beam transmitter of the plurality of beam transmitters;

transmitting from the light curtain the plurality of light intensity signals; and transmitting a trip signal in response to determining that a light intensity signal from a beam receiver of the plurality of beam receivers is below a trip threshold.

19. The method of claim 18, further comprising:

receiving, at a portable electronic device, the plurality of light intensity signals; and displaying a light intensity indicator for each light intensity signal and a relative position of the one or more beam receivers associated with each light intensity signal, wherein the light intensity indicators for each light intensity signal and corresponding positions of the one or more beam receivers provide an indication of beam alignment.

20. The method of claim 18, further comprising:

determining the amount of light intensity degradation for each of the plurality of beam receivers due to vibration of the light curtain; and notifying a user adjusting positioning of the transmitter unit and/or the receiver unit of a target threshold for each of the plurality of beam receivers, wherein the target threshold comprises the trip threshold adjusted by the amount of light intensity degradation due to an expected amount of vibration at the transmitter unit and/or the receiver unit.

* * * * *